March 8, 1966 R. F. WOODCOCK 3,238,837

IMAGE ENCODING-DECODING MULTIFIBER DEVICE

Original Filed Sept. 19, 1960

INVENTOR
RICHARD F. WOODCOCK

BY James P. McAndrews

ATTORNEY

United States Patent Office 3,238,837

Patented Mar. 8, 1966

3,238,837
IMAGE ENCODING-DECODING MULTIFIBER DEVICE

Richard F. Woodcock, South Woodstock, Conn., assignor to American Optical Company, Southbridge, Mass., a voluntary association of Massachusetts Original application Sept. 19, 1960, Ser. No. 56,746. Divided and this application July 27, 1964, Ser. No. 397,051

5 Claims. (Cl. 88—1)

This application is a division of applicant's copending application, Serial No. 56,746 filed September 19, 1960.

The field of this invention is that of image-transmitting devices and the invention relates more particularly to a novel and improved device and method of making a device for encoding and decoding an optical image.

It has been proposed to provide a fiber-optical image encoding device which embodies a multiplicity of light-transmitting fibers, the fibers being arranged in bundled relation extending from end to end of the device and being arranged in different geometrical patterns in a face at each end of the device, whereby, in accordance with well-known principles of internal reflection, the fibers are adapted to receive and transmit light from respective portions of a light image projected upon one end face of the device for reproducing the image portions in scrambled or encoded relation upon the other end face thereof. As will be readily understood, such a device can be utilized in a converse manner for receiving and transmitting light from respective portions of an image encoded by the device, thereby to decode the scrambled image to permit reading of the image in its original form.

Such encoding-decoding devices are useful in banking practices, for example, for implementing a simple and convenient signature verification system. Thus, an image of the signature of a bank depositor can be encoded by use of such a device and can be recorded in encoded form upon a passbook issued by the bank to the depositor. Subsequently, when the depositor makes a withdrawal from his account and signs the customary withdrawal slip authorizing the bank to pay money from his account, a bank teller can verify the depositor's signature upon the withdrawal slip by decoding the encoded representation of the depositor's signature as it appears upon his passbook and by visually comparing the decoded signature with that appearing on the withdrawal slip. This signature verification system is considerably less involved than the procedures presently relied upon for this purpose and permits a substantial reduction in the cost and time required for handling many routine banking transactions. However, for such a signature verification system to be practical, particularly for larger banks which may have many branch offices and may employ a large number of bank tellers, several encoding-decoding devices of the character described should be available for providing depositor's passbooks with encoded representations of the respective depositor's signatures and each teller in each main or branch office of the bank should be provided with such a device which is capable of decoding the signature appearing upon any passbook presented to him. Accordingly, implementation of such a signature verification system requires use of a large number of substantially identical image encoding-decoding devices which are adapted for interchangeable use.

A single image encoding-decoding device of the character described can be inexpensively manufactured and will function quite satisfactorily both for encoding signature images and the like and for decoding those images which have been encoded by the device. Similarly, matched pairs of such devices can be fabricated at low cost by presently known techniques and can be used interchangeably, each device of the pair being adapted to encode an image in a form which can be decoded by use of either one of the devices. However, fiber optical image encoding-decoding devices suitable for interchangeable use have not been available in the large numbers necessary for implementing the signature verification system above described and presently known techniques for making such interchangeable encoding-decoding devices in large quantities have not been economically feasible.

It is an object of this invention to provide a novel and improved image encoding-decoding device: to provide a fiber-optical image encoding-decoding device which is adapted to scramble or encode portions of an image in a pattern of predetermined configuration; to provide a large number of image encoding-decoding devices which are adapted for interchangeable use; to provide such devices which are suitable for interchangeable use to encode and decode handwritten signatures; to provide such devices which are adapted to encode and decode images without substantial loss of image resolution; and to provide such devices which are of small size, light weight and economical construction.

It is a further object of this invention to provide a novel and improved method of manufacturing the fiber optical image encoding-decoding device: to provide methods for manufacturing a large number of such devices with great accuracy so that such devices are adapted for interchangeable use; to provide methods for economically fabricating a large number of image encoding-decoding devices which are suited for interchangeable use; and to provide such manufacturing methods which are adapted to be performed by relatively unskilled personnel.

Briefly described, the fiber optical image encoding-decoding device provided by this invention includes a plurality of energy-transmitting multifibers which are rectilinear in transverse section at least adjacent their ends. Each multifiber preferably embodies a plurality of light-transmitting fibers having light-insulating coatings which are secured together in side-by-side relation. The multifibers cooperate in side-by-side relation with corresponding ends thereof stacked compactly together for defining respective end faces, and at least selected ones of the multifibers are twisted intermediate their ends so that there is a predetermined angular relation between corresponding rectilinear edges at the opposite ends of each of said selected multifibers. In this construction, the fibers embodied in the multifibers are adapted to receive and transmit energy from respective portions of an energy image such as a light image projected upon one end face of the device for reproducing said image portions upon the other end face of the device. The rectilinear end portions of the multifibers fit easily and compactly together in the desired positions within each end face of the device and the fibers embodied in each individual multifiber cooperate to reproduce a discrete fragment of the original image. However, since selected ones of the multifibers are twisted intermediate their ends, the discrete image fragments reproduced upon said other end face of the device by the various multifibers have a predetermined diverse orientation relative to each other. Accordingly, the reproduced image fragments do not cooperate to display the originally projected image in recognizable form, but cooperate in predetermined encoded relation to display the original image in encoded form.

In a preferred embodiment of this invention, the multifibers are rectilinear and equilateral in transverse section. The multifibers are assembled in side-by-side relation with their longitudinal axes parallel, and at least selected ones of the multifibers are preferably attenuated intermediate their ends and are twisted within attenuated portions thereof so that there are predetermined angular relations between corresponding rectilinear edges at opposite ends of said multifibers, the angular relations between corresponding rectilinear edges at said opposite ends preferably comprising selected multiples of the angular relation between adjacent rectilinear edges at one end of said multifibers. In this construction, the multifibers stack compactly together throughout their length and cooperate at respective ends to define faces of regular outline.

In a practical embodiment of this invention, successive layers of multifibers are arranged in predetermined angular relation so that the ends of the multifibers cooperate in predetermined different geometrical patterns at each end to define respective faces, whereby the multifibers are adapted to receive and transmit light or other energy from respective portion of an energy image projected upon one device end face for reproducing discrete image portions of the other end face of the device with predetermined diverse orientation and in a scrambled pattern of predetermined configuration.

According to the preferred method of making the device provided by this invention, there is provided a plurality of multifibers which are rectilinear, and preferably equilateral, in transverse section at least adjacent their ends. Each multifiber preferably embodies a plurality of light-transmitting fibers having light insulating coatings which are secured together in side-by-side parallel relation. At least selected ones of the multifibers are preferably attenuated intermediate their ends and are twisted around their longitudinal axes within the attenuated portions thereof for establishing a predetermined angular relation between corresponding rectilinear edges at the opposite ends of said multifibers. Preferably the angular relations established between the corresponding rectilinear edges at said opposite ends of the multifibers comprise selected multiples of the angular relation between adjacent rectilinear edges at one end of said multifibers. The multifibers are assembled in side-by-side relation, preferably with their longitudinal axes parallel, so that the radial orientation of the multifibers around their longitudinal axes is diversified in predetermined manner and so that corresponding end portions of the multifibers stack compactly together to define respective faces. Preferably where the multifibers embody light-transmitting fibers, the end faces of the device are ground and polished for optically finishing the ends of said fibers.

In a practical method provided by this invention, the multifibers are arranged in layer relation and a predetermined angular relation is established between the axes of multifibers in successive layers, whereby the multifibers cooperate at each end in predetermined different geometrical patterns to define respective faces.

Other objects, advantages and details of the image encoding-decoding device and methods of making the device provided by this invention will appear in the following more detailed description of preferred embodiments of the device and preferred methods of making the device according to this invention.

Figures 1, 2, 3, 4, 5, 6, 7, 8, 9, 10, 11, 12:
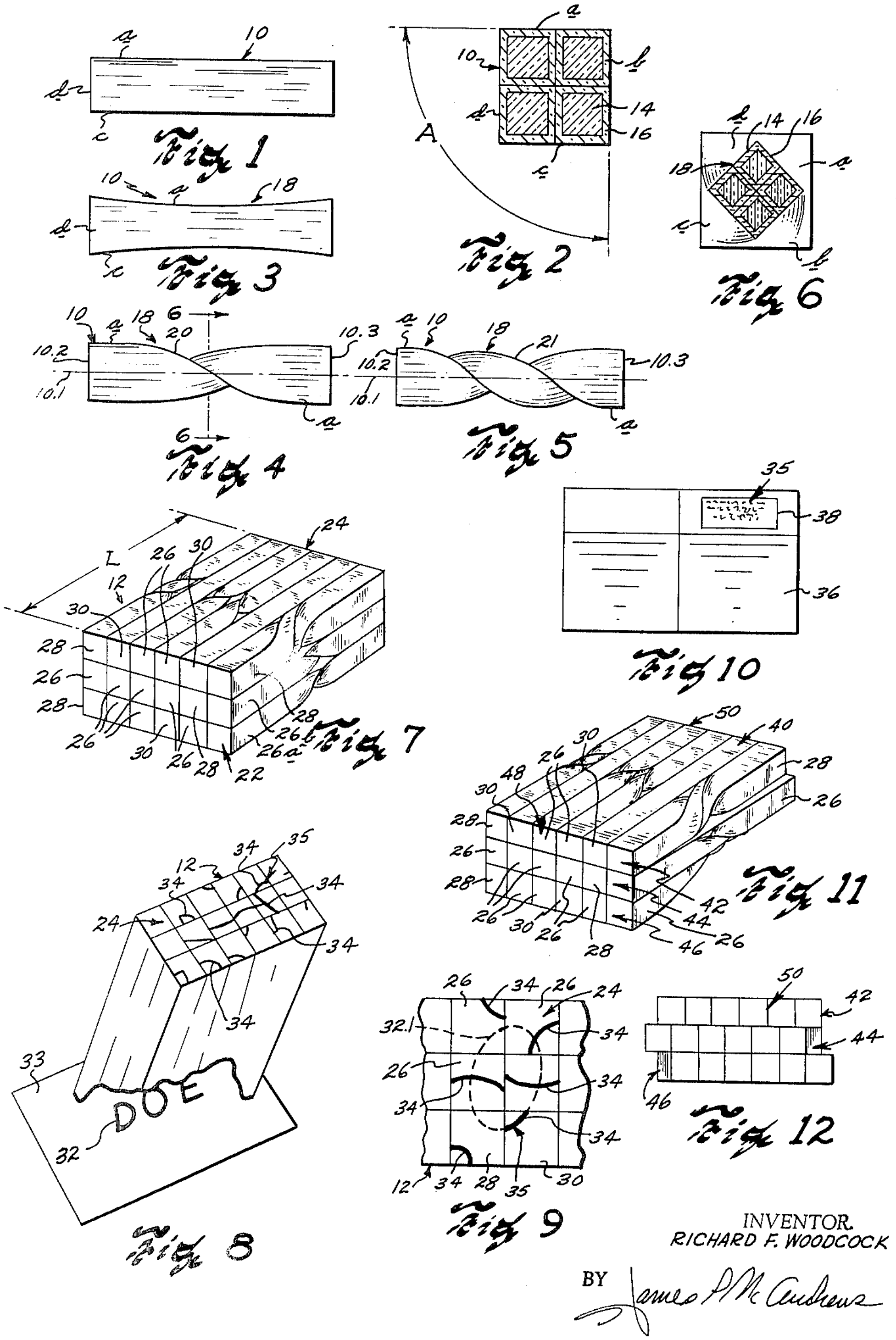
FIG. 1 is a side elevation view of a multifiber utilized in the image encoding-decoding device provided by this invention.
FIG. 2 is an end elevation view of the multifiber shown in FIG. 1.
FIG. 3 is a side elevation view of the multifiber of FIG. 1 illustrating steps in the method of device manufacture provided by this invention.
FIGS. 4 and 5 are side elevation views similar to FIG. 3 illustrating subsequent steps in device manufacture.
FIG. 6 is a section view along line 6—6 of FIG. 4.
FIG. 7 is a perspective view of the image encoding-decoding device provided by this invention.
FIG. 8 is a different perspective view of the device of FIG. 7 illustrating use of the device.
FIG. 9 is an enlarged partial view similar to FIG. 7.
FIG. 10 is a diagrammatic view illustrating use of the device provided by this invention.
FIG. 11 is a perspective view similar to FIG. 7 illustrating an alternative embodiment of this invention.
FIG. 12 is an end elevation view of the device of FIG. 11.

Referring to the drawings, 10 indicates an energy-transmitting multifiber or fiber bundle of conventional type, a plurality of such multifibers comprising the principal components of the image encoding-decoding device 12 provided by this invention. As illustrated, particularly in FIG. 2, each multifiber preferably embodies a plurality of light-transmitting fibers 14 having light-insulating coatings 16 which are secured together in side-by-side parallel relation by any suitable means for forming what can be called a coherent fiber bundle. For example, the light-transmitting fibers 14 can be comprised of a material such as flint glass, plastic or the like of relatively high index of refraction and can have light-insulating coatings 16 of crown glass or other suitable material having a relatively low index of refraction, whereby each fiber is adapted to transmit light from end to end thereof in accordance with the well-known principles of internal reflection. For convenience of illustration, only a few fibers are shown to be embodied in each multifiber 10 but it will be understood that any desired number of fibers of any desired size can be utilized for providing a multifiber of the desired cross-sectional dimensions. Since the multifibers comprise coherent fiber bundles, the fibers therein are arranged in identical geometrical patterns at each end of the multifiber and are adapted to receive and transmit light from respective portions of a light image or fragment of a light image projected upon one end of the multifiber for reproducing said image or fragment upon the other end of the multifiber. Various techniques for forming such multifibers are well known and will not be further explained herein. However, it should be understood that although light-transmitting fibers are embodied in the multifibers 10 as described herein, the multifibers could embody a plurality of electrically conductive fibers having electrically insulating coatings or could embody other types of fibers adapted to transmit energy from end to end thereof within the scope of this invention.

According to this invention, the multifibers 10 are rectilinear preferably equilateral in transverse section at least adjacent the ends thereof. Thus, as shown in FIGS. 1 and 2, the fibers are horizontally and vertically stacked together so that the sides *a*, *b*, *c*, and *d* of each multifiber are of equal length and cooperate to form a multifiber which is square in transverse section. However, the multifibers could be triangular in cross-section or could be of any polygonal cross-section within the scope of this invention. As noted above, a plurality of such multifibers is provided and at least selected ones thereof are attenuated intermediate their ends as at 18 as shown in FIG. 3. For example, the selected multifibers can be heat-softened, or otherwise treated, and can be drawn otherwise elongated in any conventional manner for reducing the cross-sectional dimensions of the selected multifibers intermediate their ends.

Then the selected multifibers are twisted around their longitudinal axes 10.1 for establishing a predetermined angular relation between correspondingly rectilinear edges or sides of each multifiber at the opposite ends thereof, the twist in the multifibers preferably being located within attenuated portions of the multifibers, as shown at 20 and 21 in FIGS. 4 and 5 respectively, so that, as shown particularly in FIG. 6, the twisted portions of the multifibers do not increase the overall size of the multifibers. Preferably the angular relations established between corresponding rectilinear edges at opposite ends of the selected multifibers comprise selected multiples of the angular relation between adjacent rectilinear edges or sides at one end of the multifibers. Thus, where the multifibers are square in transverse section as illustrated, certain fibers are preferably twisted in the manner shown in FIG. 4 so that the side *a* for example, at one end 10.2 of a multifiber is disposed at an angle 90° relative to the corresponding side *a* at the opposite end 10.3 of the multifiber, this angular relation equaling the angle A, shown in FIG. 2, between adjacent sides *a* and *b* at one end of the multifiber. As will be understood, where the multifibers are triangular and equilateral in transverse section, the angular relation established between corresponding rectilinear edges at opposite ends of the selected twisted multifibers would comprise selected multiples of the 60° angle between adjacent edges at one end of such multifibers. Techniques for twisting the multifibers to provide the desired angular relations between said edges of the selected multifibers with substantial accuracy are well known and will not be further explained herein. However, it should be understood that, although the attenuation and twisting of the multifibers has been described for individual multifibers, a long length of multifiber could be attenuated and twisted at spaced intervals in any conventional manner and then could be cut into desired lengths each of which embodied the desired twist for providing a plurality of multifibers of the character described. Further, although each multifiber is shown to have a single twist for establishing the desired angular relation between said edges of the multifiber, more than one twist could be utilized for accomplishing this result. For example, the multifiber illustrated in FIG. 5 could be provided with two separate 90° twists for establishing the illustrated 180° angular relation between corresponding edges or sides at opposite ends of the multifiber. Hereinafter, those selected multifibers having a 90° twist therein will be indicated at 26, multifibers having a 180° twist therein will indicated at 28, and untwisted multifibers will be indicated at 30.

According to this invention a plurality of multifibers 26, 28 and 30 of various twist angles are stacked in side-by-side relation to form the device 12, the multifibers cooperating at each end to define respective faces 22 and 24 as shown in FIG. 7. Only a few multifibers are shown in FIG. 7 for convenience of illustration but it should be understood that a sufficient number of multifibers can be used to build up device faces 22 and 24 to any desired size. Since the multifibers are rectilinear in transverse section and since the twisted portions of those multifibers which have been twisted are not larger or more bulky than the end portions of the multifibers, the multifibers can be conveniently stacked in side-by-side relation at each end so that the longitudinal axes of the multifibers are parallel and so that the position of each multifiber within the device face 22 exactly corresponds to the position of that multifiber within the device face 24. However, the multifibers of different twist angles are arranged in a predetermined pattern and, preferably, the radial orientation of the various multifibers around their longitudinal axes is diversified in a predetermined manner. Thus, as shown in FIG. 7, multifibers 26, 28 and 30 can be arranged in a predetermined pattern and certain of the multifibers, for example the multifibers indicated at **26*a* and 26*b* which have 90° twist angles, can be oriented so that, as viewed in FIG. 7, the multifiber 26*b*, for example, has a clockwise twist therein and the multifiber 26*a* has a counterclockwise twist therein. Preferably the multifibers are secured in side-by-side relation by use of a suitable cement such as an epoxy resin (not shown) but any other suitable means for holding the multifibers in position to form the device 12 are within the scope of this invention. Where the multifibers embody light-transmitting fibers as above described, the faces 22 and 24 of the device 12** are preferably ground and polished in conventional manner for optically finishing the ends of said fibers.

It should be understood that although individual multifibers are shown to be stacked in side-by-side relation for forming the device 12, long multifibers with a series of related twists therein could be secured in side-by-side relation in a similar manner and could then be cut to the proper length in any suitable manner for providing a plurality of devices 12 of the character described.

In this construction, where the multifibers embody light-transmitting fibers as illustrated for example, the fibers embodied in the multifibers are adapted to receive and transmit light from respective portions of a light image projected upon one end face of the device 12 for reproducing said image portions upon the opposite end face of the device, the reproduced image portions transmitted by each individual multifiber cooperating to reproduce a discrete image fragment in a mosaic form which corresponds to a fragment of the original image. However, since the various multifibers are twisted intermediate their ends and have different radial orientations around their longitudinal axes, the image fragments reproduced upon said opposite device face by the various multifibers are diversely oriented relative to each other in a predetermined manner and do not cooperate to reproduce the originally projected image in recognizable form. For example, the signature "DOE" can be written in opaque ink as at 32 on a translucent card 33. The card can be placed against the face 22 of the device 12 as illustrated, and light from a suitable source (not shown) can be directed through the card upon the device face 22 for projecting the signature image 32 upon said face. The fibers embodied in each individual multifiber are adapted to receive and transmit light from respective portions of the device face 22 and reproduce mosaic fragments 34 of the original image 32 upon the device face 24. Each multifiber reproduces a discrete image fragment 34 upon the device face 24 but the image portions reproduced by the various multifibers are diversely oriented and do not cooperate to reproduce the signature 32 in recognizable form. This is best illustrated by reference to FIG. 9 wherein the dotted line 32.1 represents the image of the letter "O" originally projected upon the device face 22 and wherein the full, dark lines 34 represent fragments of the image of the letter "O" which have been reproduced in reoriented relation upon the device face 24. Thus, the unrecognizable image fragments 34 reproduced upon the device face 24 constitute an encoded representation 35 of the original signature image 32.

In order to transmit an image of a handwritten signature, for example, with a satisfactory degree of resolution, the fibers embodied in the multifibers 10 should be adapted to transmit light from an image portion which is smaller than the smallest discrete detail of the signatures to be encoded. Similarly, in order to reproduce the original image in a form which is not recognizable, the multifibers 10 should be adapted to transmit an image portion which is substantially larger than the largest discrete detail of the signatures to be encoded. However, each multifiber is preferably small enough so that they are not adapted to transmit entire individual letters of the signatures. For practical purposes, to encode most signatures as customarily written for business purposes, the fibers 14 can be on the order of 25 to 50 microns in diameter or maximum transverse dimension; each multifiber can embody a sufficient number of such multifibers to form a multifiber which is between .075 inch and .100 inch square; and a sufficient number of multifibers can be embodied in the device 12 to define device faces 22 and 24 which are .5 inch wide and 3.0 inches long.

As will be readily understood, the device 12 is adapted to decode an image such as the encoded representation 35 of the signature 32 which has been encoded by use of the device. Thus, where the encoded and unrecognizable representation 35 of the signature 32 is projected upon the face 24 of the device 12 is any suitable manner, and is properly aligned therewith by the use of suitable guide means for example, the multifibers embodied in the device are adapted to receive and transmit light from respective portions of the encoded image for reproducing the image portions upon the device face 22 in properly oriented relation, whereby the encoded image is displayed upon the face 22 in its original, recognizable or decoded form.

It can be seen that the image encoding-decoding device 12 provided by this invention utilizes straight and twisted multifibers which can be inexpensively provided in accurately proportioned configurations by conventionally known techniques as noted above. Further the multifibers can be conveniently arranged in the desired pattern with great accuracy. In addition, the spacing L (see FIG. 7) between faces of the device 12 need be only large enough to accommodate a single multifiber twist between the faces and can be less than one-half inch in length. Accordingly, the device provided by this invention is of inexpensive, compact, and lightweight construction. However, the device can be accurately manufactured in large numbers so that devices produced by the disclosed manufacturing methods are adapted for interchangable use. That is, a large number of devices 12 can be manufactured so that one device can be used to encode an image and any other device can be used for decoding the image.

Such devices are useful in banking practice, for example, for implementing a simple and convenient signature verification system. Thus, a bank can use an image encoding-decoding device 12 for transposing a depositor's signature, such as shown at 32 in FIG. 8, into encoded or unrecognizable form as shown at 35 in FIG. 9. This encoded representation of the depositor's signature can be recorded upon a passbook 36, for example by photographing the device face 24 and by attaching the photograph 38 to the passbook in any suitable manner, and the passbook can be issued to the bank depositor at the time he opens an account with the bank. Preferably the means for recording the encoded signature should be adapted to reproduce the encoded signature without reversing or inverting the encoded signature. The passbook, of course, can comprise the customary bank deposit passbook upon which deposits and withdrawals from the depositor's account would normally be recorded. Subsequently, when the depositor makes a withdrawal from his account and signs the customary withdrawal slip authorizing the bank to pay money from his account, a bank teller can use the device 12 for verifying the depositor's signature. Thus, the face 24 of the device 12 can be aligned with the encoded representation 35 of the depositor's signature as it appears in the photograph 38 on the depositor's passbook to permit reading of the depositor's signature in a recognizable decoded form upon the device face 22. The decoded signature can then be visually compared to the depositor's signature as it appears on the withdrawal slip. As will be readily understood, loss of the passbook containing the encoded representation of the depositor's signature does not entail substantial risk, since a putative forger, not having access to an encoding-decoding device 12, could not use the encoded representation of the depositor's signature appearing on the passbook as an aid in forging the depositor's signature.

An alternative embodiment 40 of the image encoding-decoding device provided by this invention is illustrated in FIGS. 11 and 12. In this embodiment, a plurality of the multifibers 26, 28 and 30 are arranged in side-by-side relation within layers 42, 44 and 46 for example, the longitudinal axes of the multifibers within each layer preferably being parallel to each other. As described above with reference to FIGS. 1–8, multifibers of various twist angles are arranged in a predetermined pattern with predetermined diverse orientation around their longitudinal axes. In addition, however, the multifibers in successive layers of the device are offset relative to each other, preferably being arranged so that there is a predetermined angular relation between the longitudinal axes of the multifibers in successive layers. Thus, as shown in FIG. 11, the multifibers in the various layers of the device 40 can cooperate at one end to define a rectangular face 48. The multifibers in the device layer 42 can extend normal to the device face 48, and the multifibers in layers 44 and 46 can extend obliquely from the face 48 in different directions, whereby the multifibers cooperate at the opposite end to define face 50 of irregular outline as shown in FIG. 12. When a signature image is projected upon the device face 48 in the manner described above with reference to FIG. 8, the multifibers within the device are adapted to receive and transmit light from respective portions of the image for reproducing fragments of said image upon the device face 50 as above described. The reproduced image fragments will have a predetermined diverse orientation upon the device face 50 as above described with reference to FIGS. 8 and 9, and in addition, as will be understood, the image fragments reproduced by successive layers of the multifibers will be displaced in a horizontal direction as well as reoriented, the extent and direction of such displacement being determined by the angular relation between the multifibers in successive device layers and by the spacing L, between the device faces 48 and 50. Accordingly, the image fragments reproduced on the face 50 will be substantially scrambled in a pattern of predetermined configuration and will comprise an encoded representation of the originally projected signature image.

It should be understood that although particular embodiments of the device and methods provided by this invention have been disclosed, this invention includes all modifications and equivalents thereof which fall within the scope of the appended claims.

Having described my invention, I claim:

1. An image encoding device comprising a plurality of energy-transmitting multifibers each embodying a plurality of energy-transmitting fibers having energy-insulating coatings, said fibers being horizontally and vertically stacked together and secured in side-by-side relation to each other so that each multifiber is adapted to receive energy at one end from a discrete image fragment for reproducing said image fragment in mosaic form at the oppostie end of the multifiber, selected multifibers being twisted around their longitudinal axes intermediate their ends to receive energy from an image fragment at one end for reproducing said image fragment in reoriented relation around the multifiber axis at the opposite end of the multifiber, said multifibers being secured together in side-by-side relation with their axes parallel for forming said device and having corresponding ends stacked together for defining faces at respective opposite ends of the device, said multifibers being diversified in a predetermined pattern within said device so that the multifibers receive energy from discrete fragments of an image at one device face for dissecting said image and reproduce said image fragments with diverse orientation relative to each other on the opposite device face for encoding said image.

2. A signature-image encoding device as set forth in claim 1 in which said multifibers embody light-conducting fibers having light-insulating coatings, said fibers being small enough in diameter to reproduce a portion of a light image smaller than the smallest image detail to be resolved by said device, said multifibers being large enough in cross section to dissect said image so that image reproduced by said multifibers in said device form an unrecognizable overall image.

3. A signature-image encoding device as set forth in claim 1 in which said multifibers embody light-conducting fibers having light-insulating coatings, said fibers being no greater than about 50 microns diameter, said multifibers being rectilinear in transverse section and being between 75 and 100 thousandths of an inch in transverse dimensions.

4. An image-encoding device comprising a plurality of image-transmitting multifibers each embodying a plurality of light-transmitting fibers having light-insulating coatings which are secured together in side-by-side horizontally and vertically stacked relation to each other, some of said multifibers being straight to receive light from an image fragment at one end for reproducing the image fragment in mosaic form with the same orientation around the longitudinal axis of the multifiber at the opposite end of the multifiber, the remainder of said multifibers being twisted around their longitudinal axes to different extents to receive light from an image fragment at one end for reproducing said image fragment in reoriented relation around the multifiber axis at the opposite end of the multifiber, said multifibers being secured together with their axes parallel for forming said device and having corresponding multifiber ends stacked together for defining faces at respective opposite ends of said device, said straight and twisted multifibers being diversified in a predetermined pattern within said device with said twisted multifibers having diverse radial orientations around their axes in said predetermined pattern so that the multifibers receive light from respective fragments of a light image at one device face for dissecting said image and reproduce said image fragments with diverse orientation relative to each other on the opposite device face to encode said image.

5. An image-encoding device as set forth in claim 4 in which said multifibers are rectilinear and equilateral in transverse section, said multifibers being secured compactly together in side-by-side horizontally and vertically stacked relation in said devices with the desired radial orientations around their longitudinal axes by reference to said rectilinear transverse sections, said twisted multifibers being attenuated intermediate their ends and being twisted only within said attenuated portions for permitting said multifibers to fit compactly together.

References Cited by the Examiner

UNITED STATES PATENTS

| | | | |
|---|---|---|---|
| 3,125,013 | 3/1964 | Herrick et al. | 88—1 X |
| 3,141,106 | 7/1964 | Kapany | 88—1 X |

FREDERICK M. STRADER, *Primary Examiner.*

JOHN K. CORBIN, *Examiner.*